United States Patent [19]

Kato et al.

[11] 4,099,348

[45] Jul. 11, 1978

[54] MACHINING ARRANGEMENT WITH MEANS TO ISOLATE VIBRATIONS FROM THE WORKING SPINDLE

[75] Inventors: Shigeo Kato, Mitaka; Sakae Saito; Osamu Morita, both of Hachioji, all of Japan

[73] Assignee: Hitachi, Ltd., Japan

[21] Appl. No.: 801,373

[22] Filed: May 27, 1977

[30] Foreign Application Priority Data

May 28, 1976 [JP] Japan .................. 51-61164

[51] Int. Cl.² .................................. B24B 41/02
[52] U.S. Cl. ............................. 51/92 R; 51/166 TS; 90/11 A; 173/162
[58] Field of Search ............... 51/72 R, 92 R, 166 R, 51/166 TS, 166 FB, 166 MH, 47, 99, 134.5 R; 248/22; 173/162; 90/11 A

[56] References Cited

U.S. PATENT DOCUMENTS

| | | | |
|---|---|---|---|
| 1,243,358 | 10/1917 | Stoddard | 248/22 X |
| 1,445,617 | 2/1923 | Jehu | 248/22 |
| 1,888,480 | 11/1932 | Storm | 51/134.5 R |
| 2,091,456 | 9/1937 | Rybick | 51/99 X |
| 2,621,452 | 12/1952 | Wells | 51/166 TS |
| 3,094,816 | 6/1963 | Dreier | 51/166 R X |

*Primary Examiner*—N. P. Godici
*Attorney, Agent, or Firm*—Craig & Antonelli

[57] ABSTRACT

A surfacing or finishing machine for precision machining of a workpiece which includes a grinding wheel or edging tool installed on a working spindle, a driving motor for rotating the working spindle, and a power transmitting system for transmitting power from the driving motor to the working spindle. The power transmitting system includes a flexible link mechanism fashioned of a number of link belts or the like interconnected in series by a number of rotatable pulleys. The driving motor and power transmitting system are so arranged with respect to the surfacing and finishing machine that the working spindle is isolated from adverse vibrations which result from the operation of the driving motor and power transmission system.

32 Claims, 6 Drawing Figures

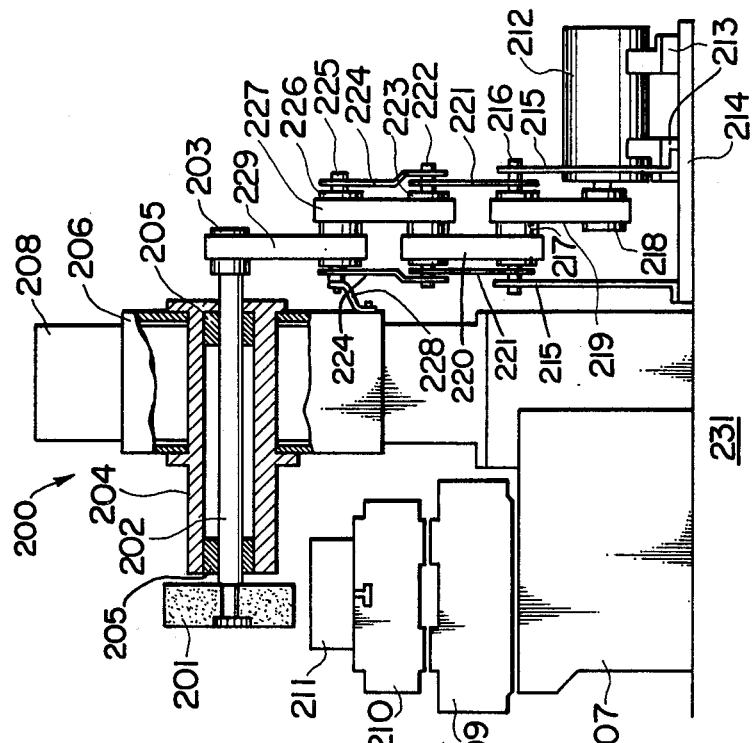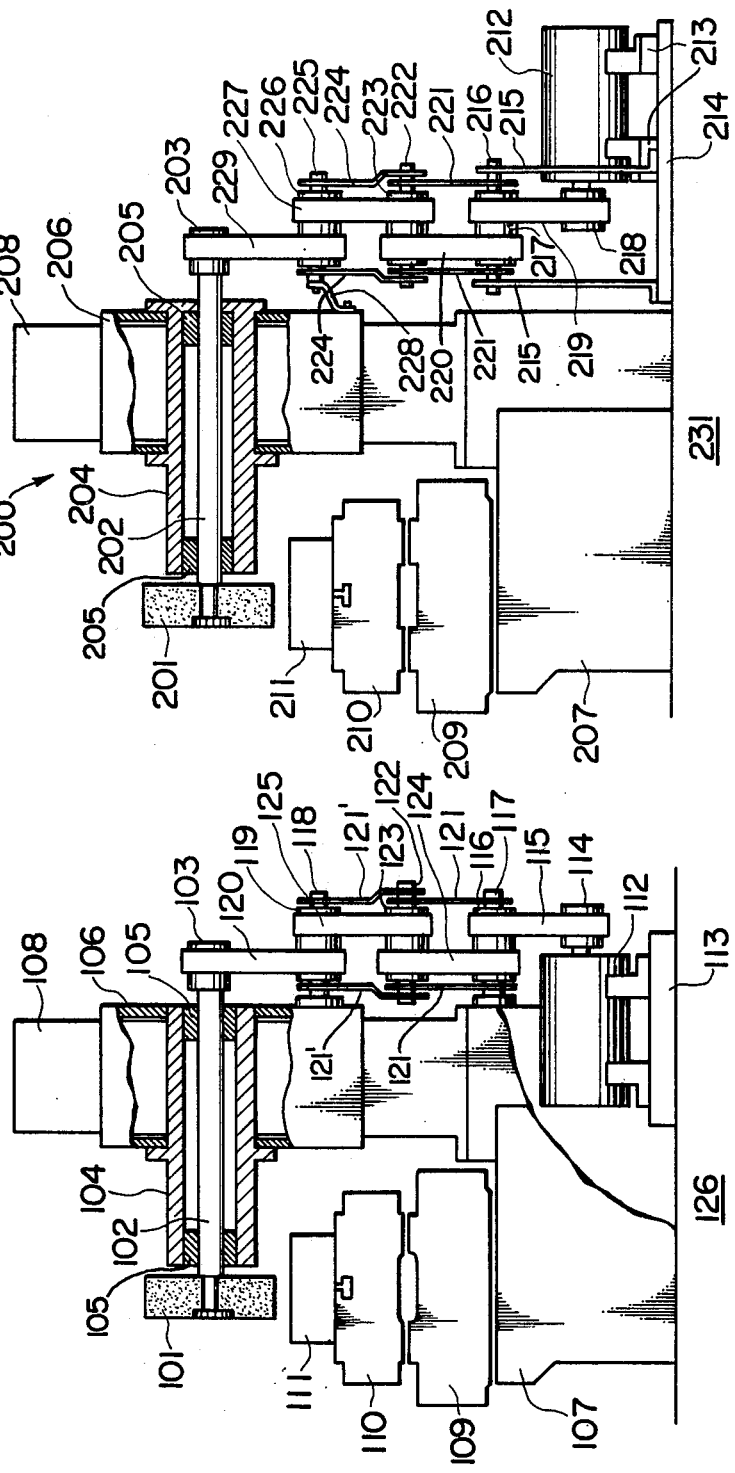

FIG. 3
FIG. 4
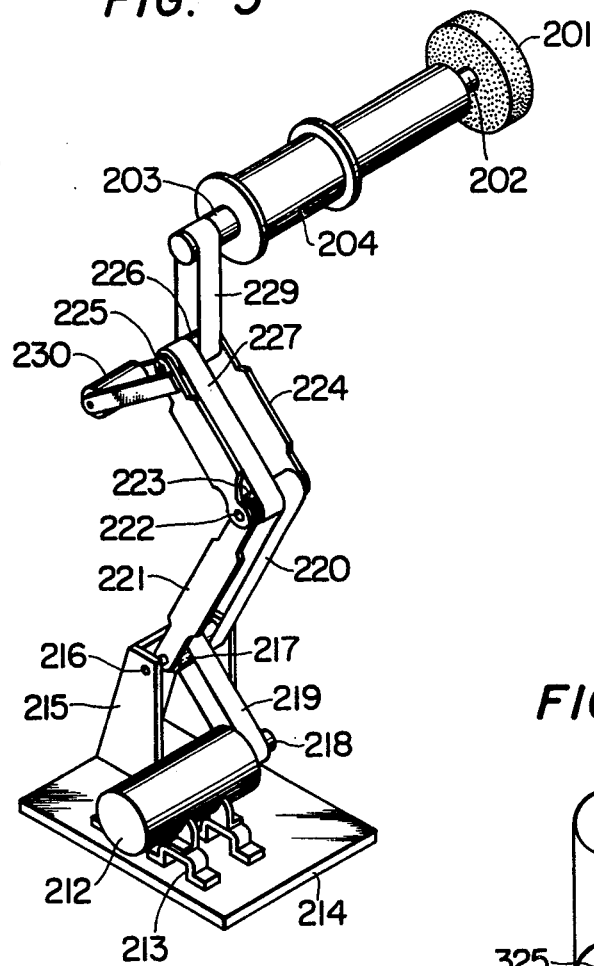
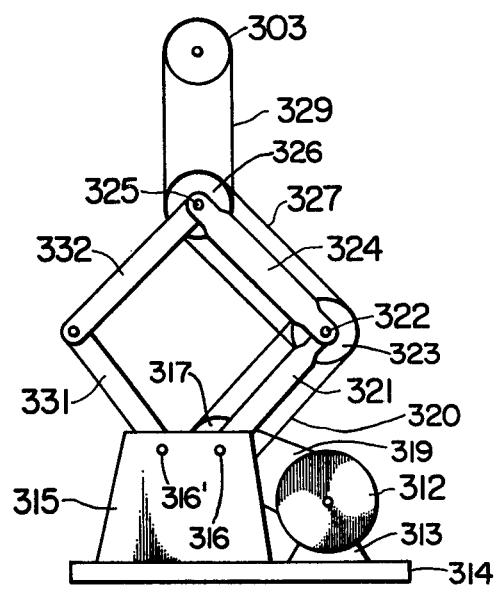

MACHINING ARRANGEMENT WITH MEANS TO ISOLATE VIBRATIONS FROM THE WORKING SPINDLE

BACKGROUND OF THE INVENTION

The present invention relates to a machining arrangement and, more particularly, to a surfacing or finishing machine which includes a surface grinder, a cylindrical grinder or the like by which high precision machining of a workpiece is obtained by a grinding wheel or edging tool.

In machining operations, it is generally necessary to machine the surface of a workpiece to a mirror-like finish. To accomplish such finishing, it is absolutely required that the machining be effected by a rotating tool such as a grinding wheel or an edged tool with vibrations at the rotating tool being maintained at an absolute minimum.

In conventional surfacing or finishing machines, the drive motor for rotating the wheel spindle which is a working spindle or a pulley for transmitting mode of power are sources of vibrations which are transmitted to the surfacing tool or spindle slider for supporting the wheel spindle. This transmission of vibrations adversely affects the finishing of the surface of the workpiece and, by virtue of the construction of conventional machines, it is impossible to rotate the wheel spindle without generating and transmitting vibrations to the surfacing tool as will become more apparent from the following description of a conventional grinding machine.

In a conventional finishing or surfacing machine such as, for example, illustrated in FIG. 1, a machining tool such as a grinding wheel 101 is fixed to a wheel spindle 102 at one end portion with a pulley 103 being fixed to the other end portion of the wheel spindle 102.

The wheel spindle 102 is supported by bearings 105 installed within a bearing housing 104 fixed to a spindle slider 106 which is slidably guided by a column 108 arranged on a machine bed 107. A saddle 109 and a machine table 110 are disposed on the machine bed 107 and are movable in a vertical direction against the movement of the bearing housing 104 with the workpiece 111 being mounted on the table 110 so as to permit machining by the grinding wheel 101.

A motor 112 for rotating the grinding wheel is fixed on a floor 126 through a rubber damper 113 or on the machine bed 107 with the driving power from the motor 112 being transmitted from a motor pulley 114 to a belt 115 which rotates a pulley 116 around a first shaft 117 fixed to the machine bed 107. A second shaft 118, having rotatably mounted thereon a pulley 119, is fixed to the spindle slider 106 with driving power being transmitted between the pulley 119 and spindle pulley 103 by a belt 120. A first pair of arms 121 are rotatably mounted at one end thereof on a fixed shaft 117 with the other ends thereof being mounted on a movable shaft 122 having a pulley 123 rotatably mounted thereon. A second pair of spaced arms 121' are arranged between the movable shaft 122 and the fixed shaft 118 with first ends of the arms being rotatably mounted on the shaft 118 and the other ends thereof rotatably mounted on the movable shaft 122. A belt 124 is arranged between the pulley 116 and the pulley 123 and another belt 125 is arranged between the pulley 123 and pulley 119, whereby the drive power from the motor 112 is transmitted to the wheel spindle 102 through the respective belts and pulleys. While the afore-described conventional surface grinder attempts to minimize the undesirable vibrations generated by the motor from being transmitted to the wheel spindle, we have found that the vibrations may be transmitted to the wheel spindle from other unexpected portions of the drive arrangement of the surface grinder. Specifically, we have determined that the first pulley transmitting the driving power from the first belt to the second belt, in the course of its rotation around the first fixed shaft, generates rotating vibrations which are transmitted from the first fixed shaft to the machine bed by virtue of the fact that the shaft is fixed thereto. The vibrations generated by the rotating first pulley are transmitted to the wheel spindle through the column and spindle slider. Additionally, during rotation of the pulley around the second fixed shaft, further vibrations are generated and transmitted by the second fixed shaft to the wheel spindle through the spindle slider.

Consequently, in practical operation, one disadvantage of the afore-described conventional surface grinder resides in the fact that, due to the fixed connection to the machine bed and spindle slider, portions of the link mechanism which provide the required tensional force to the transmitting belts generate and transmit vibrations to the wheel spindle so that high precision machining of a workpiece is not possible.

SUMMARY OF THE INVENTION

The aim underlying the present invention essentially resides in providing a finishing or surface grinding machine which isolates the finishing tool from adverse vibrations generated and transmitted by the power transmitting system of the machine so that high precision machining may be readily carried out.

According to one feature of the present invention, the drive arrangement for the finishing or surfacing machine is not mounted at the machine and only a final link of a belt drive of a plurality of drive belts and drive pulleys is connected to the working spindle. By virtue of this arrangement, the rotating vibrations normally generated by the belts and pulleys of the drive arrangement are isolated from the working spindle and the machining tool so that the generated vibrations are minimized if not completely avoided.

According to yet another feature of the present invention, the power transmission system for the drive motor to the working spindle is constructed as a flexible link mechanism which permits ready adjustment of the respective elements of the power transmission system upwardly and downwardly as well as laterally in both directions.

According to a still further feature of the present invention, a counterweight is arranged in the power transmission system for balancing the system and providing a desired predetermined tension to the final belt link leading to the working spindle.

Additionally, according to the present invention, means are provided for preventing adverse swinging of the flexible link mechanism and also for coupling a portion of the power transmission system to a further element of the grinding or surfacing machine. Preferably, the latter means are constructed as a flexible stopper or damper fashioned of rubber or rubber-like material so as to further ensure the isolation of the working spindle from adverse vibrations.

In accordance with another feature of the present invention, to ensure the isolation of vibrations from the driving motor to the working spindle, an independent base plate is mounted on a support surface separately from the surfacing or finishing machine upon which base plate is mounted the driving motor. Preferably, vibration damping elements are employed to mount the driving motor to the base plate.

According to a still further feature of the present invention, the flexible link mechanism of the power transmission system includes at least four link belts and at least four pair of arms arranged symmetrically with respect to one another. By virtue of this latter construction, it is possible to dispense with the counterweight and the flexible linkage automatically compensates for any imbalance in the power transmission system.

It is also possible in accordance with the present invention to provide a power transmission system having a single pair of spaced arms mounted on a frame arranged at the base plate with at least one pulley being arranged at the respective ends of the arms and at least three drive link belts arranged between a drive pulley of the driving motor and one of the pulleys arranged at one of the ends of the arms, between the pulleys arranged at the respective ends of the arms, and between a pulley on the working spindle and the other pulley arranged on the spaced arms. By virtue of this construction, it is possible to minimize the number of elements in the power transmission system and thereby minimize the sources of potential vibrations.

Accordingly, it is an object of the present invention to provide a workpiece machining arrangement which avoids by simple means the disadvantages and drawbacks encountered in the prior art.

A further object of the present invention resides in providing a workpiece machining arrangement which minimizes, if not avoids, any generation and transmission of vibrations from the drive and power transmission system to the machining tool.

Another object of the present invention resides in providing a workpiece machining arrangement which is relatively simple in construction and therefor also relatively inexpensive to manufacture.

A still further object of the present invention resides in providing a workpiece machining arrangement which assures a high precision surface finishing under all operating conditions.

Another object of the present invention resides in providing a workpiece machining arrangement which maintains satisfactory accuracy of the machining operation, yet minimizes the number of parts necessary therefor.

These and further objects, features and advantages of the present invention will become more apparent from the following description when taken in connection with the accompanying drawings which show, for the purposes of illustration, three embodiments in accordance with the present invention, and wherein:

BRIEF DESCRIPTION OF THE DRAWINGS

FIG. 1 is a partial cross-sectional side view of a conventional surfacing or finishing machine;

FIG. 2 is a partial cross-sectional side view of a workpiece machining arrangement in accordance with the present invention;

FIG. 3 is a rear perspective view of the power transmitting system of FIG. 2;

FIG. 4 is a partial schematic side view of another power transmitting system in accordance with the present invention;

DETAILED DESCRIPTION OF THE INVENTION

Figure 6:
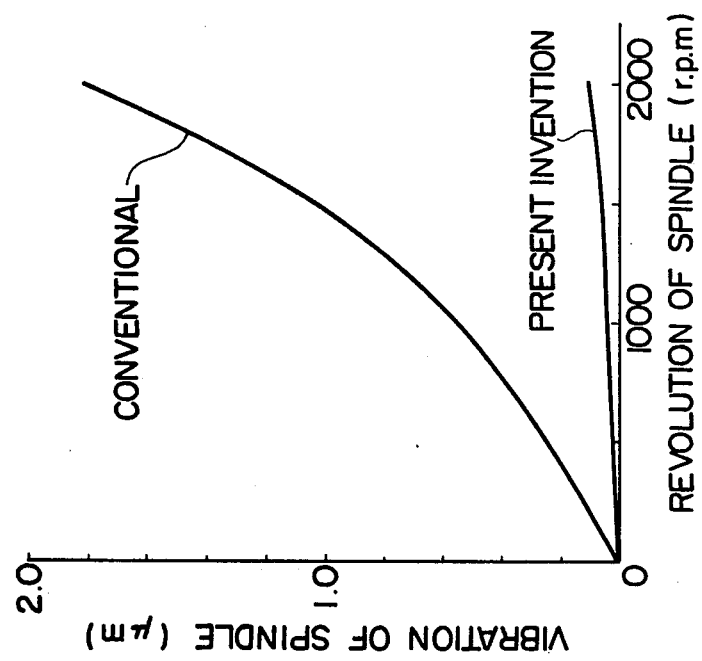
FIG. 6 is a graphical representation comparing the vibrations of a conventional machine and the machine arrangement in accordance with the present invention.

Referring now to the drawings wherein like reference numerals are used throughout the various views to designate like elements and, more particularly, to FIG. 2, according to this figure, a surface grinder or finishing machine generally designated by the reference numeral 200 is provided which includes a rotatable working or wheel spindle 202 having arranged at respective end portions a machine tool such as, for example, a grinding wheel 201 and a spindle pulley 203. The working or wheel spindle 202 is rotatably supported within a bearing housing 204 by bearings 205 with the bearing housing 204 being arranged at and displaceable with a spindle slider 206 slidably guided upwardly and downwardly by a column 208 arranged on a machine bed 207. A saddle 209 and a table 210 are arranged on the machine bed 207 with a workpiece 211 being mounted on the table 210 for machining by the grinding wheel 201. The above description relates to the surface grinder or finishing machine 200 itself.

A drive arrangement is provided which includes a source of power, for example, an electric motor 212 fixedly mounted on a base plate 214 by rubber dampers 213. The base plate 214 is separated from and unattached to the surface grinder or finishing machine 200, but is fixedly attached to a support surface such as, for example, a floor 231. A generally U-shaped frame is fixedly mounted on the base plate 214 with a fixed shaft 216 being mounted in vertically extending spaced side walls 215 of the frame. A first pulley 217 is rotatably mounted on the fixed shaft 216.

Two spaced arms 221 are provided with one end portion of each of the arms being rotatably mounted on the fixed shaft 216 and the other end portion of each of the arms 221 mounting a first movable shaft 222 on which is rotatably arranged a second pulley 223. Two further spaced arms 224 and one end portion thereof are rotatably mounted on the first movable shaft 222 with the other end portions of the arms 224 being rotatably mounted on a second movable shaft 225 on which is rotatably mounted a third pulley 226.

To provide for transmission of driving power to the wheel spindle 202, a first belt or belt link member 219 is arranged between a motor pulley 218 and first pulley 217 with a second, third and fourth belt, 220, 227, 229, respectively, being arranged between the pulley pairs 217–223, 223–226 and 226–203. Thus, a rotation of the motor pulley 218 results in a rotation of the pulleys 217, 223, 226 and 203 with the transmission of driving power being effected by the link belts 219, 220, 227 and 229.

The third pulley 226 is connected to a spindle slider 206 by way of a damper or coupling member 228 which is constructed so as to elastically connect the pulley 226 and the spindle slider 206. The member 228 may be fashioned of rubber or rubber-like material. By virtue of the provision of the member 228, the third pulley 226 as well as the associated link members are prevented from freely swinging, but the pulley 226 may be freely moved upwardly and downwardly by movement of the spindle slider 206.

As apparent from the above description, the four spaced arms 221, 224 are arranged so as to form a flexible link mechanism which is not only movable freely upwardly and downwardly, but also to the right and to the left, i.e., into and out of the plane of FIG. 2.

Any vibrations resulting from the operation of the motor 212 and/or the rotation of the three pulleys 218, 217, 223, are only slightly transmitted to the third pulley 226. By virtue of the provision of the elastic damper or coupling member 228, the slight vibrations are not transmitted from the third pulley 226 through the member 228 to the surface grinder or finishing machine 200. Thus, the working spindle or wheel spindle 202 is isolated from any adverse vibrations generated by the driving arrangement.

Moreover, a fourth belt 229 is made of a high elastic material so that the transmission of driving power from the third pulley 226 to the pulley 203 and the machine tool 201 can be effected without the generation and/or transmission of any vibration and the third pulley 226 is completely isolated at the fourth belt 229 and does not transmit vibrations to the working spindle or wheel spindle 202 through the fourth belt 229. Therefore, only the rotating driving power is transmitted from the tird pulley 226 to the working or wheel spindle 202 through the fourth belt 229.

As shown most clearly in FIG. 3, the four arms 221, 224 forming the flexible link mechanism are arranged such that a clockwise moment acts thereon with the end of the link mechanism, that is, the portion of the third pulley 226 being urged toward the right in the figure. To balance the clockwise and counterclockwise moments in the flexible linkage, a counterweight 230 is arranged at the opposite side of the arms 224.

As shown in FIG. 4, a drive motor 312 is fixedly mounted on a base plate 314 separated and unattached to the surface grinder or finishing machine with a frame 315 being fixedly mounted on the base plate 314. To pairs of spaced arms 321, 324, corresponding to arms 221, 224 are provided and mount movable shafts 322, 325 and pulleys 323, 326, corresponding respectively to shafts 222, 225 and pulleys 223, 226. A fixed pulley 317, corresponding to pulley 217, is mounted on a fixed shaft 316 arranged at the frame 315 with the driving power being transmitted from the motor 312 to the respective pulleys by drive belts or link elements 319, 320, 327 corresponding to the elements 219, 220 and 227.

A belt 329, corresponding to belt 229, of a highly elastic material is arranged between the pulley 326 and the spindle pulley 303, corresponding to the spindle pulley 203, for transmitting power from the pulley 326 to the working or wheel spindle and the machine tool. A first pair of spaced arms 331 are provided with one end of each of the arms being pivotally connected with a fixed shaft 316' arranged at the frame 315 and the other ends thereof being pivotally connected to first ends of a further pair of spaced arms 332. The arms 331 and 332 are symmetrically disposed with respect to the arms 321, 324 and provide a flexible linkage between the fixed frame 315 and the second movable shaft 325. By virtue of this arrangement, the counterweight 230 of the construction of FIG. 3 may be eliminated since the symmetrical disposition of the arms 321, 324, 331, 332 provides for a balance of the clockwise and counterclockwise moments in the linkage. With the exception of the above-described elements, the construction of FIG. 4 operates in the same manner as the construction illustrated in FIGS. 2 and 3.

Figure 5:
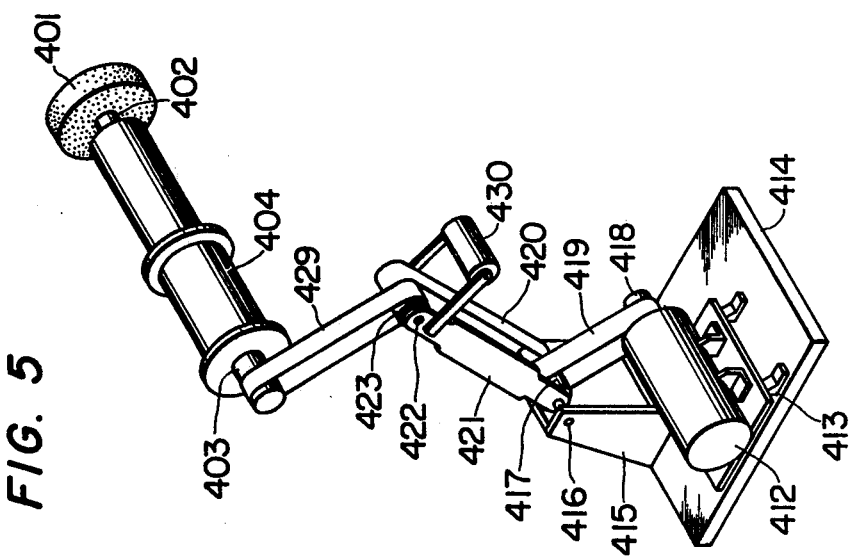
FIG. 5 is a rear perspective view of a further power transmitting system in accordance with the present invention.

As shown in FIG. 5, a drive motor 412 is fixedly mounted on a base plate 414 through rubber dampers 413 with the base plate 414 being independent of and unattached to the surfacing or finishing machine. A frame 415 is arranged on the base plate 414 and mounts a fixed shaft 416 therein at which is rotatably mounted first ends of a pair of spaced arms 421, the other ends of which mount a movable shaft 422 having a pulley 423 rotatably mounted thereon.

A first belt 419 transmits driving power from a drive pulley 418 to a first pulley 417 rotatably mounted on the fixed shaft 416 with a second belt 420 transmitting the driving power from the pulley 417 to the pulley 423. A third belt 429 of a highly elastic material is arranged between the pulley wheel 423 and a pulley 403 provided on a working or wheel spindle 402 arranged in a bearing housing 404. A suitable machine tool such as, for example, a grinding wheel 401 is arranged on the wheel or work spindle 402. A counterweight 430 is fixed on the arms 421 to provide the necessary tensional force for the third belt 429 and balance the clockwise and counterclockwise moments on the linkage.

As apparent from the above description of FIG. 5, the construction illustrated therein is similar to the construction of FIGS. 2 and 3; however, one less belt and associated pulley and arm are employed in transmitting the driving power from the drive motor 412 to the work or wheel spindle 402. For example, in the FIG. 5 construction, the belt 227, arms 224, movable shaft 225 and pulley 226, as illustrated in FIG. 3, may be dispensed with as well as the arms 331, 332 and 324 of the construction of FIG. 4. Moreover, the elements 401-404, 412-423, 429 and 430, respectively, correspond to the elements 201-204, 212-223, 229 and 230 of FIG. 3; therefore, a further discussion of the operation and function of such elements is deemed unnecessary.

As with the arrangement of FIGS. 2 and 3, an appropriate damper or coupling member of a resilient material such as, for example, the member 228, is provided for coupling the last members of the link mechanisms of FIGS. 4 and 5 with the spindle slider of the finishing or surfacing machine so as to prevent swinging of the flexible link mechanism. Thus, in FIG. 4, the coupling member would be provided at the pulley 326; whereas, in FIG. 5, such member would be arranged at the pulley 423.

By virtue of the arrangement of the respective elements in accordance with the present invention, the driving motor and rotating pulleys of the power transmission system which are the source for generating the undesirable vibrations are completely isolated from the workpiece machining arrangement and the driving power is transmitted to the working spindle through the link mechanism with only the final belt being connected to the working spindle of the machine tool so that the working spindle is rotated essentially vibration-free and, consequently, is incapable of transmitting any adverse vibrations to the maching tool.

According to the present invention, a workpiece having a mirror-like surface of a surface roughness of 0.02 $\mu$m can be achieved, while in the case of a conventional surface grinder such as shown in FIG. 1, a surface roughness of the workpiece at most is 0.1 $\mu$m.

In the graphical illustration of FIG. 6, the axis of the abscissa denotes the rpm's of the spindle and the axis of the ordinate denotes the vibration ($\mu$m) of the working spindle. At a speed of about 2,000 rpm, which is considered to be the normal speed of revolution for a surface grinder, the vibration of the working spindle in accordance with the present invention is slightly generated, i.e., 0.1 μm; whereas, in a conventional surface grinder, the vibration of the spindle increases as the revolution of the working spindle increases. Specifically, at 2,000 rpm, the vibration of the working spindle in a conventional surface grinder is 1.8 μm. Consequently, in accordance with the features of the present invention, the working spindle can almost be completely isolated from any vibration derived from the motor and power transmission system of a machining arrangement.

Furthermore, in a workpiece machining arrangement in which the working spindle is slidable up and down, the link mechanism is arranged on the pulley of the working spindle and, therefore, the weight of the link mechanism is added to the pulley. Thus, the damping factor of the rotating power when the machine stops rotating can be markedly increased. The time that it takes the working spindle to stop rotating can be considerably shortened and the exchanging operation of the workpiece can be properly and efficiently performed. In the above-described arrangements of the present invention, the surfacing or finishing machine employs a wheel grinder as a machine tool installed on a working spindle which is movable upwardly and downwardly; however, the present invention is not limited to a surface grinder and the principles can also be applied to a cylindrical grinder in which a machining tool is movable to the right and left and in which machining tool is constructed by milling cutters or the like.

While we have shown and described several embodiments in accordance with the present invention, it is understood that the same is not limited thereto, but is susceptible of numerous changes and modifications as are known to persons skilled in the art, and we therefor do not wish to be limited to the details shown and described herein, but intend to cover all such changes and modifications as are encompassed by the scope of the appended claims.

We claim:
1. A workpiece machining arrangement comprising: means for machining a workpiece,
a rotatable spindle means mounted at said machining means,
a tool mounted on said rotatable spindle means,
driving means for rotating said rotatable spindle means,
means for transmitting a driving power from said driving means to said rotatable spindle means including a flexible linkage comprising a plurality of interconnected link members, said link members including at least two laterally spaced arms with pulley means arranged at respective end portions of said arms, at least three belt means arranged in series between the pulley means, the driving means and the rotatable spindle means, said belt means being rotatably supported by said pulley means, a first of said at least three belt means being arranged between said driving means and a first of said pulley means, and only a last of said at least three belt means being arranged between one of said pulley means and said rotatable spindle means,
a base plate means for mounting said driving means, said base plate means being independent of and unattached to said machining means,
a fixed frame mounted on said base plate means,
a shaft mounted in said fixed frame,
wherein one end portion of said two arms is rotatably mounted at said shaft, and
wherein said driving means, said transmitting means and said machining means are arranged with respect to each other such that the rotatable spindle means is completely isolated from any vibrations generated by said driving means and said transmitting means.

2. A workpiece machining arrangement according to claim 1, wherein said machining means includes a machine table means for accommodating a workpiece to be machined.

3. A workpiece machining arrangement according to claim 1, wherein at least one movable shaft means is provided for interconnecting said link members, and wherein at least one of said pulley means is rotatably mounted on said movable shaft means.

4. A workpiece machining arrangement according to claim 1, wherein damping means are interposed between said driving means and said base plate means for absorbing vibrations of said driving means, and wherein said driving means is an electric motor.

5. A workpiece machining arrangement according to claim 4, wherein said damping means are constructed of a rubber material.

6. A workpiece machining arrangement according to claim 1, wherein means are provided for preventing a swinging of said flexible linkage.

7. A workpiece machining arrangement according to claim 1, wherein said tool is a grinding wheel.

8. A workpiece machining arrangement according to claim 1, wherein said tool is an edging tool.

9. A workpiece machining arrangement according to claim 1, wherein said machining means is a surface grinder.

10. A workpiece machining arrangement according to claim 1, wherein said machining means is a cylindrical grinder.

11. A workpiece machining arrangement comprising: means for machining a workpiece,
a rotatable spindle means mounted at said machining means,
a tool mounted on said rotatable spindle means,
driving means for rotating said rotatable spindle means,
means for transmitting a driving power from said driving means to said rotatable spindle means including a flexible linkage comprising a plurality of interconnected link members, a plurality of pulley means arranged at said link members, a plurality of belt means arranged in series between the pulley means, the rotatable spindle means and the driving means, a first of the series of belt means is arranged between said driving means and a first of said plurality of pulley means, and only a last of the series of belt means is arranged between one of said pulley means and said rotatable spindle means, and
means for balancing the flexible linkage and tensioning the last of the series of belt means,
wherein said driving means, said transmitting means and said machining means are arranged with respect to each other such that the rotatable spindle means is completely isolated from any vibrations generated by said driving means and said transmitting means.

12. A workpiece machining arrangement comprising: means for machining a workpiece, a rotatable spindle means mounted at said machining means, a tool mounted on said rotatable spindle means, driving means for rotating said rotatable spindle means, means for transmitting a driving power from said driving means to said rotatable spindle means including a flexible linkage comprising a plurality of interconnected link members, a plurality of pulley means arranged at said link members, a plurality of belt means arranged in series between the pulley means, the driving means and the rotatable spindle means, a first of the series of belt means is arranged between said driving means and a first of said plurality of pulley means, and only a last of the series of belt means is arranged between one of said pulley means and said rotatable spindle means, and means for preventing a swinging of said flexible linkage, said preventing means being constructed as an elastic stopper means interposed between said flexible linkage and a portion of said machining means, wherein said driving means, said transmitting means and said machining means are arranged with respect to each other such that the rotatable spindle means is completely isolated from any vibrations generated by said driving means and said transmitting means.

13. A workpiece machining arrangement according to claim 12, wherein said elastic stopper means is fashioned from a rubber material.

14. A workpiece machining arrangement comprising:
means for machining a workpiece, a rotatable spindle means mounted at said machining means, a tool mounted on said rotatable spindle means, driving means for rotating said rotatable spindle means, means for transmitting a driving power from said driving means to said rotatable spindle means including a flexible linkage comprising a plurality of interconnected link members, a plurality of pulley means arranged at said link members, a plurality of belt means arranged in series between the pulley means, the driving means and the rotatable spindle means, a first of the series of belt means is arranged between said driving means and a first of said plurality of pulley means, and only a last of the series of belt means is arranged between one of said pulley means and said rotatable spindle means, and a base plate means for mounting said driving means, said base plate means being independent of and unattached to said machining means, said flexible linkage includes four belt means, said link members include arm means for supporting at least three pulley means, a first of said arm means being supported on a fixed frame mounted on the base plate means, two of said belt means being arranged between the pulley means supported by said arm means with the remaining belt means respectively connecting said pulley means with said driving means and said rotatable spindle means, wherein said driving means, said transmitting means and said machining means are arranged with respect to each other such that the rotatable spindle means is completely isolated from any vibrations generated by said driving means and said transmitting means.

15. A workpiece machining arrangement according to claim 14, wherein further arm means are provided and disposed symmetrically with respect to said first-mentioned arm means for balancing the flexible linkage and for providing proper tension on said belt means.

16. A workpiece machining arrangement comprising:
means for machining a workpiece, a rotatable spindle means mounted at said machining means, a tool mounted on said rotatable spindle means, driving means for rotating said rotatable spindle means, means for transmitting a driving power from said driving means to said rotatable spindle means including a flexible linkage comprising a plurality of interconnected link members, a plurality of pulley means arranged at said link members, a plurality of belt means arranged in series between the pulley means, the driving means and the rotatable spindle means, a first of the series of belt means is arranged between said driving means and a first of said plurality of pulley means, and only a last of the series of belt means is arranged between one of said pulley means and said rotatable spindle means, a base plate means for mounting said driving means, said base plate means being independent of and unattached to said machining means, a fixed frame mounted on said base plate means, a shaft mounted in said fixed frame, said link members include a first pair of laterally spaced arms having first end portions and second end portions, said first end portions being rotatably mounted at said shaft, a second pair of laterally spaced arms having first end portions and second end portions, a movable shaft means for connecting the second end portions of said first pair of laterally spaced arms with the first end portions of said second pair of laterally spaced arms, a shaft means at said second end portions of said second pair of laterally spaced arms, a further shaft means at said second end portions of said second pair of laterally spaced arms, a pulley means rotatably mounted at each of said shaft, said movable shaft means and said further shaft means, at least four belt means are provided with a first of said belt means being arranged between said driving means and said pulley means at said shaft, a second of said belt means being arranged between said pulley means at said shaft and said pulley means at said movable shaft means, a third of said belt means being arranged between said pulley means at said movable shaft means and said pulley means at said further shaft means, and a fourth of said belt means being arranged between said pulley means at said further shaft means and said rotatable spindle means, wherein said driving means, said transmitting means and said machining means are arranged with respect to each other such that the rotatable spindle means is completely isolated from any vibrations generated by said driving means and said transmitting means.

17. A workpiece machining arrangement according to claim 16, wherein means are provided for balancing the flexible linkage and for providing a tension for the belt means arranged between said spindle means and said pulley means arranged at said further shaft means.

18. A workpiece machining arrangement according to claim 17, wherein said belt means arranged between said spindle means and said pulley means arranged at said further shaft means is constructed of a highly elastic material.

19. A workpiece machining arrangement according to claim 18, wherein means are disposed between one of said pair of spaced lateral arms and a portion of the machining means for preventing a swinging of said flexible linkage.

20. A workpiece machining arrangement according to claim 19, wherein said preventing means are constructed as an elastic stopper means.

21. A workpiece machining arrangement according to claim 20, wherein said elastic stopper means is fashioned from a rubber material.

22. A workpiece machining arrangement according to claim 16, wherein two additional pairs of laterally spaced arms are provided and symmetrically disposed with respect to said first and second pairs of laterally spaced arms, and wherein a further shaft is provided at said fixed frame for rotatably mounting first end portions of one pair of said two additional pairs of laterally spaced arms, a further movable shaft means is provided for interconnecting adjacent end portions of said two additional pairs of laterally spaced arms, and a free end portion of the other pair of said additional pair of laterally spaced arms is rotatably mounted at said further movable shaft means.

23. A workpiece machining arrangement according to claim 22, wherein means are disposed between one of said pair of spaced lateral arms and a portion of the machining means for preventing a swinging of said flexible linkage.

24. A workpiece machining arrangement according to claim 23, wherein said preventing means are constructed as an elastic stopper means.

25. A workpiece machining arrangement according to claim 24, wherein said elastic stopper means is fashioned from a rubber material.

26. A workpiece machining arrangement according to claim 25, wherein said belt means arranged between said spindle means and said pulley means arranged at said further shaft means is constructed of a highly elastic material.

27. A workpiece machining arrangement comprising:
means for machining a workpiece,
a rotatable spindle means mounted at said machining means,
a tool mounted on said rotatable spindle means,
driving means for rotating said rotatable spindle means,
means for transmitting a driving power from said driving means to said rotatable spindle means including a flexible linkage comprising a plurality of interconnected link members, a plurality of pulley means arranged at said link members, a plurality of belt means arranged in series between the pulley means, the driving means and the rotatable spindle means, a first of the series of belt means is arranged between said driving means and a first of said plurality of pulley means, and only a last of the series of belt means is arranged between one of said pulley means and said rotatable spindle means,
a base plate means for mounting said driving means, said base plate means being independent of and unattached to said machining means,
a fixed frame mounted on said base plate means,
a shaft mounted in said fixed frame,
said link members include a pair of laterally spaced arms having first end portions and second end portions, said first end portions being rotatably mounted at said shaft,
a further shaft at said second end portions of said pair of laterally spaced arms,
one of said plurality of pulley means being rotatably mounted at each of said shaft and said further shaft,
three belt means are provided with a first of said belt means being arranged between the pulley means at the shaft and said driving means, a second of said belt means being arranged between the pulley means mounted at the shaft and the pulley means mounted at the further shaft, and a third of said belt means being arranged between said pulley means mounted at said further shaft and said rotatable spindle means,
wherein said driving means, said transmitting means and said machining means are arranged with respect to each other such that the rotatable spindle means is completely isolated from any vibrations generated by said driving means and said transmitting means.

28. A workpiece machining arrangement according to claim 27, wherein means are provided for balancing the flexible linkage and for providing a tension for the belt means arranged between said spindle means and said pulley means arranged at said further shaft.

29. A workpiece machining arrangement according to claim 28, wherein said belt means arranged between said spindle means and said pulley means arranged at said further shaft is constructed of a highly elastic material.

30. A workpiece machining arrangement according to claim 27, wherein means are disposed between said pair of laterally spaced arms and a portion of the machining means for preventing a swinging of said flexible linkage.

31. A workpiece machining arrangement according to claim 30, wherein said preventing means are constructed as an elastic stopper means.

32. A workpiece machining arrangement according to claim 31, wherein said elastic stopper means is fashioned from a rubber material.

* * * * *